ical axis, in a bore 9 of the slide. The slide 8 is
United States Patent Office 3,081,013
Patented Mar. 12, 1963

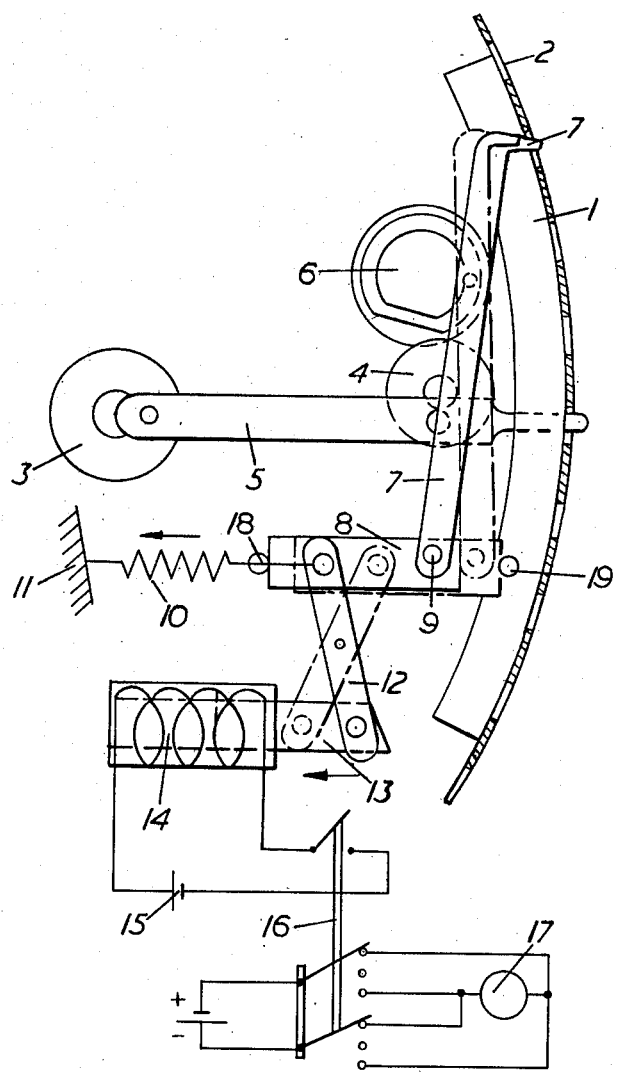

3,081,013
CINEMATOGRAPHIC APPARATUS
Hans Walther, Dresden, Germany, assignor to VEB Kamera- und Kinowerke Dresden, Dresden, Germany
Filed Feb. 21, 1961, Ser. No. 90,672
5 Claims. (Cl. 226—49)

The invention relates to a gripper arrangement for cinematographic apparatuses, especially back-projectors, which are equipped with film wind-back.

Winding back of a film is not readily possible by simple pole change of the drive motor however in the case of back projectors which are equipped with conveying and locking grippers for the sake of better positioning of the picture. The difficulties then occurring consist in that the transport gripper does not move back in the case of wind-back of the film into such a precise position that damage to the film by the locking gripper is avoided.

It is the problem of the invention to avoid such damage to the film without reconstruction of the gripper mechanism.

In accordance with the invention this problem is solved due to the fact that the switching over of the film winder to reverse and pivoting out of the locking gripper from the perforation of the film are positively coupled for the duration of the wind back.

The invention will be explained in greater detail by reference to the drawing. Behind a film track 1 with the film 2 there are arranged the conveying gripper 5, driven in known manner by the eccentric discs 3 and 4, and the locking gripper 7 driven by means of the cam disc 6. The locking gripper 7 is guided in the cam disc 6 and is mounted on a slide 8 movable in the direction of the optical axis, in a bore 9 of the slide. The slide 8 is connected on the one hand through a traction spring 10 with the projector housing 11 and on the other hand through a double-armed lever 12 with an armature 13 of an electro-magnet 14, the feed current circuit being connected through a current source 15 with a switch 16. The switch 16 is at the same time arranged in the feed current circuit of the drive motor 17 with reversible polarity. In the direction of movement of the slide 8 there are situated stop bolts 18 and 19.

The manner of operation of the arrangement is as follows:

In forward winding of the film the grippers 5 and 7 work in the known manner. If a switch over is made to winding back of the film, where projection is not effected, only the conveyor gripper 5 effects the winding back of the film 2, while the locking gripper 7 is pivoted out of the perforation of the film for the duration of the winding back of the film. This is effected in a manner wherein with the polarity reversal of the drive motor 17 the switch 16 is positive coupled to the supply of the electro-magnet 14. Thus the armature 13 is pulled up and through the lever 12 the slide 8 is pushed against the stop 19, so that it assumes the position shown in dot-dash lines. As a result of the now shifted pivot point of the locking gripper 7 and of the cam disc 6 which has remained in the same position, the locking gripper 7 is pivoted out of the film perforation, namely so far that when the cam disc 6 rotates it works idly. On reversal of polarity of the drive motor for the purpose of normal projection the current circuit in the electro-magnet 14 is interrupted, the slide 8 as a result of traction force of the spring 10 is drawn against the stop 18 and the locking gripper 7 is brought into the working position again due to the shifting of the pivot thereof.

I claim:

1. In a cinematographic apparatus including a housing in which is arranged a film gate, the provision of a film drive mechanism comprising a film conveying member in the housing engageable with perforations in the film in the gate, a film locking member pivotally mounted in the housing enagageable with said perforations during the normal forward running of the film through the gate, means for reciprocating said locking member, a reversible motor for driving the film conveying member and the means for reciprocating said locking member, a change-over switch for reversing the direction of rotation of the motor, and means coupled with said change-over switch and capable of altering the position of reciprocation of said locking member to render the latter inoperative during the winding back of the film through the plate.

2. In a cinematographic apparatus including a housing in which is arranged a film gate, the provision of a film drive mechanism comprising a film conveying member in the housing engageable with perforations in the film in the gate, a slide member provided in the housing to slide in the direction of the optical axis of the apparatus, a film locking member pivotally mounted on said slide member engageable with said perforations during the normal forward running of the film through the gate, means for reciprocating said locking member, a reversible motor for driving the film conveying member and the means for reciprocating said locking member, a change-over switch for reversing the direction of rotation of the motor, and means coupled between said slide member and said change-over switch, said slide member being movable into a position by said means coupled to it during the winding back of the film through the gate to displace the pivot of the locking member and thereby render the locking member inoperative.

3. A cinematographic apparatus according to claim 2, wherein said means coupled between the slide member and the change-over switch comprises an electro-magnet having an armature and a switch in the circuit of said electro-magnet; a double-armed lever pivoted on the housing for effecting the connection between the armature and the slide member.

4. A cinematographic apparatus according to claim 3, wherein a common switch operating member provides a mechanical coupling between the switch in the circuit of the electro-magnet and the change-over switch.

5. In a cinematographic apparatus including a housing in which is arranged a film gate, the provision of a film drive mechanism comprising a film conveying member in the housing engageable with perforations in the film in the gate, a slide member provided in the housing to slide in the direction of the optical axis of the apparatus, stops provided on the housing for limiting the movement of said slide member, a spring connected between the housing and the slide member for urging the latter towards one stop member, a film locking member pivotally mounted on said slide member engageable with said perforations during the normal forward running of the film through the gate, means for reciprocating said locking member, a reversible motor for driving the film conveying member and the means for reciprocating said locking member, a change-over switch for reversing the direction of rotation of the motor, and an electro-magnet between said slide member and said change-over switch, said slide member being movable into a position by said electro-magnet during the winding back of the film through the gate to displace the pivot of the locking member and thereby render the locking member inoperative.

References Cited in the file of this patent
UNITED STATES PATENTS

| | | |
|---|---|---|
| 2,702,491 | Favre | Feb. 22, 1955 |
| 2,909,096 | Barnett | Oct. 20, 1959 |
| 2,986,968 | Kropp et al. | June 6, 1961 |